F. L. MacDONAGH.
VISIBLE INDEX.
APPLICATION FILED MAR. 26, 1917.
1,375,464.
Patented Apr. 19, 1921.
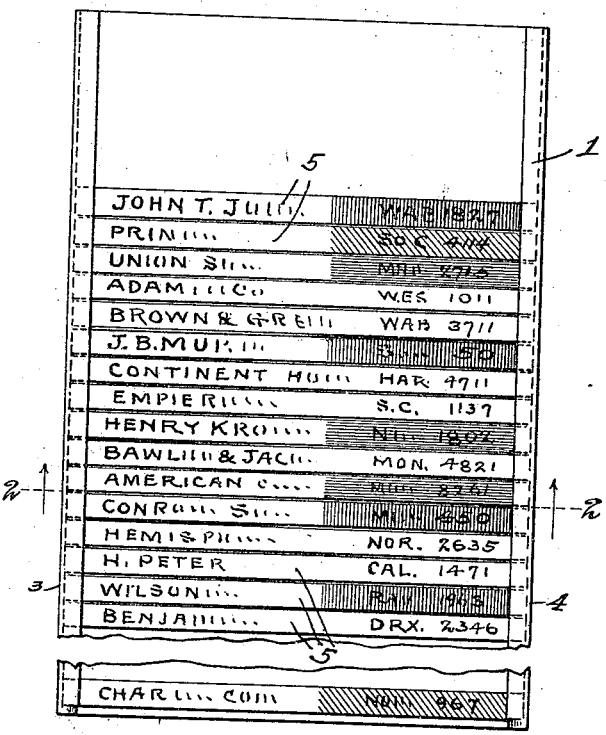

UNITED STATES PATENT OFFICE.

FRANK L. MacDONAGH, OF CHICAGO, ILLINOIS, ASSIGNOR TO ACME CARD SYSTEM COMPANY, OF CHICAGO, ILLINOIS, A CORPORATION OF SOUTH DAKOTA.

VISIBLE INDEX.

1,375,464.  Specification of Letters Patent.  Patented Apr. 19, 1921.

Application filed March 26, 1917. Serial No. 157,304.

*To all whom it may concern:*

Be it known that I, FRANK L. MAC-DONAGH, a citizen of the United States, residing in the city of Chicago, county of Cook, and State of Illinois, have invented certain new and useful Improvements in Visible Indexes, of which the following is a specification.

This invention relates to improvements in visible indexes, and refers more particularly to improvements in record systems in which a plurality of record slips are detachably seated in a suitable frame.

The salient object of the invention is to provide a detachable signal, which serves to indicate conditions applying to the identifying data contained on any given slip.

In devices of this general character, the record slips are mounted in a frame and contain, for example, such data as will show the name of the customer, account number, and credit rating. The purpose of the signal is to designate to the user of the system that on certain of the cards or slips, rulings, classifications or other special information apply to them either temporarily or permanently. For example, the normal credit of all the parties whose names are designated on the slips is $1000. Certain of these persons, however, may be delinquent in paying their bills, others may be merely slow in paying and others may become of very doubtful character. These conditions, of course, may on the other hand, be only temporary. When an account of delinquent or doubtful character becomes again good, the signal may be withdrawn from the slip, which automatically indicates to the user that the account has been restored to normal. The signal may consist of a colored piece of celluloid, paper or other material. Blue, for example, designates that the account is slow pay, and indicates to the user that he would be cautious in extending too much credit; a red signal indicates to the user that the customer has become delinquent but still his credit is considered good but that credit should not be extended beyond a certain amount, say $500. A green signal might be used to indicate that the account has become bad and no credit should be extended, while an orange signal might be used to indicate that before extending credit to this person, the manager of the store or the credit man should be consulted.

It is to be understood that these signals may be used for other uses than for credits, and they may be transparent or not, but they should, of course, be of a different color or of a distinguishing character from the slips themselves.

Another use to which the invention may be put, might be in telephone exchanges, where the doctors might be always designated by a green signal; fire houses by red signals; police stations by blue signals. These signals may also be used when any given telephone is out of order or is cut off.

Still another use to which the invention might be put is in connection with a business house having a large number of salesmen and the signals might be used to designate whether the salesman is on the road, whether he is expected in soon and what territory he is in. Also these signals might be used to designate in a list of customers what salesmen have called on certain customers or whether the customers are heavy or large buyers. In fact, the invention may be put to a multitude of uses, which the foregoing instances illustrate.

In the drawings:

Figure 1 is a fragmentary perspective view of a visible record frame, showing a plurality of transparent tubes with identifying slips.

Fig. 2 is a horizontal sectional view taken on lines 2—2 of Fig. 1 and looking in the direction of the arrows.

Fig. 3 is an enlarged fragmentary sectional detail view.

Fig. 4 is an enlarged fragmentary perspective view.

Fig. 5 is an enlarged view of one of the signal strips.

In the drawings: 1 designates as a whole the frame comprising a main back portion 2, and tube receiving channels 3 and 4. Between these channels is detachably seated a plurality of transparent slip holders 5. Each of these slip holders is preferably formed of transparent celluloid comprising a substantially U-shaped portion 6, having legs 7 and 8, the former being provided with an extension 9, bent back upon itself to form a channel 10, all as shown more clearly in Fig. 4. In each of these tubes 5 is detachably held the identifying slip 11, which in the present instance is shown as containing the name of the customer and his telephone number. It is to be understood, however, that as above stated, that any suitable identifying data can be put upon the slip. As shown more clearly in Fig. 1, in certain ones of these tubes is detachably seated a signal 12, which in the present instance is also shown as consisting of various colored celluloid. In order that these signals may be more readily removed, they are provided at one end with a headed portion 13. These signals are so constructed that they do not, in any way, interfere with the insertion of the tube into the frame, as they lie substantially flat.

The signals may be inserted in position and removed by merely taking out the corresponding tube and slipping the signal out of the tube. The invention is not limited to the details of construction shown, except as set forth in the appended claim.

I claim as my invention:

In visible indexes, the combination with a channel frame member, a plurality of transparent slip holders mounted therein, a slip detachably seated in each holder and extending substantially throughout the length thereof and a plurality of transparent different colored indicators detachably mounted on selected ones of said slip holders and extending across only a portion of the length of the latter.

FRANK L. MacDONAGH.